Patented Nov. 4, 1930

1,780,343

UNITED STATES PATENT OFFICE

MELVIN DE GROOTE, OF ST. LOUIS, AND LOUIS T. MONSON, OF MAPLEWOOD, MISSOURI, ASSIGNORS TO WM. S. BARNICKEL & COMPANY, OF WEBSTER GROVES, MISSOURI, A CORPORATION OF MISSOURI

PROCESS FOR BREAKING PETROLEUM EMULSIONS

No Drawing.    Application filed January 21, 1929.  Serial No. 334,104.

This invention relates to the treatment of emulsions of mineral oil and water, such as petroleum emulsions, for the purpose of separating the oil from the water.

Petroleum emulsions are of the water-in-oil type, and comprise fine droplets of naturally-occurring waters or brines, disposed in a more or less permanent state throughout the oil which constitutes the continuous phase of the emulsion. They are obtained from producing wells and from the bottoms of oil storage tanks, and are commonly referred to as "cut oil", "roily oil", "emulsified oil" and "bottom settlings".

The object of our invention is to provide a novel and inexpensive process for separating petroleum emulsions of the character referred to, into their component parts of oil and water or brine.

Briefly described, our process consists in subjecting a petroleum emulsion of the water-in-oil type to the action of a treating agent or demulsifying agent consisting of a mixture composed of or comprising a sulfonic treating body and a wood sulfite liquor substance or material, thereby causing the emulsion to break down and separate into its component parts of oil and water or brine when the emulsion is permitted to remain in a quiescent state after treatment.

Sulfonic treating bodies of the kind contemplated by our process are well-known in the art of dehydrating oil. They have heretofore been used alone and in admixture with other substances to form treating agents or demulsifying agents suitable for use in the resolution of petroleum emulsions of the water-in-oil type, but so far as we have been able to determine, such sulfonic treating bodies have never been combined with, or used in admixture with, wood sulfite liquor substances or materials, to produce a demulsifying agent suitable for use in the treatment of petroleum emulsions of the water-in-oil type to break the same.

The sulfonic treating body used to form one or more ingredients of the demulsifying agent contemplated by our process may be any sulfonic material which is of such a character or nature that it will have a demulsifying effect or action on a petroleum emulsion of the water-in-oil type. Some of the various sulfonic treating bodies or materials which are known to have demulsifying properties making them adaptable for use in the dehydration of petroleum emulsions, are sulfonic modified fatty bodies including oleo-sulfonic acid and its salts; ricinoleo-sulfonic acid and its salts; petroleum sulfonic bodies, such as petroleum sulfonic acids derived from the treatment of petroleum with sulfuric acid, and the salts of such materials; poly-cyclic aromatic sulfonic acids and their salts, modifications or derivatives, such as sulfonic acids of alkylated aromatics in which an aromatic or alkyl or aralkyl residue is introduced into the aromatic by agency of a labile halogen, or by agency of the acid sulfate derived from the action of sulfonic acid on an alcohol; propylated naphthalene sulfonic acid; and condensation products such as Twitchell reagents or allied bodies in which an aromatic and a fatty body or other soap-forming body are condensed and combined with a sulfonic group.

The wood sulfite liquor material or substance that is used to form the other ingredient of the demulsifying agent employed by our process is easy to obtain, and it can be produced or obtained at a relatively low cost. One available source of supply for such substances or materials is the liquor that is obtained as a waste product in the manufacture of paper stock by the sulfite process, which sulfite process, as is well known, consists of cooking wood chips under pressure in a digestor with bisulfite liquor or bisulfite acid, which is obtained by oxidation of sulfur and subsequent reaction with milk of lime prepared from limestone, preferably a calcium or magnesium limestone. The said cooking operation produces a mixture of wood pulp and wood sulfite liquor, and subsequently said mixture is subjected to treatment so as to separate and recover the wood pulp from the wood sulfite liquor. Wood sulfite liquor or liquor extract, suitable for use as one of the ingredients of the treating agent or demulsifying agent employed by our process, can also be produced or obtained as the direct product or principal product of a process consisting of cooking inferior woods not suitable or practicable for use in the manufacture of paper stock, with bisulfite liquor or bisulfite acid of the kind referred to, and then recovering the wood sulfite liquor from the unsuitable wood pulp which constitutes the waste product of the process, the cooking operation being carried on under pressure in a digestor or other suitable apparatus.

Concentrated wood sulfite liquor or extract of the kind above referred to is of approximately the following composition:

| | |
|---|---|
| Specific gravity | 30.2° Baumé |
| Ash | 6.59 per cent |
| Iron | .034 per cent |
| Lime (CaO) | 1.32 per cent |
| Magnesia (MgO) | 1.54 per cent |
| Solids | 51.03 |
| Soluble solids | 51.03 |
| Non-tannin | 28.80 |
| Tannin | 22.23 |
| Tannin purity | 43.54 |

The form, state or condition of the wood sulfite liquor at the time it is combined with the sulfonic treating body or bodies to produce the demulsifying agent employed by our process may be varied to suit existing conditions. It can be used in its natural state, as it comes from the digestor, i. e., in a more or less dilute acid state, but we prefer to neutralize it prior to mixture with the organic detergent body, so that the oil recovered by our process will not have a destructive corroding action on the pipe lines, tank cars or storage tanks in which said oil is confined. One simple and efficient procedure that may be used to neutralize the wood sulfite liquor consists in treating the same with caustic soda, caustic potash, ammonium hydroxide, magnesium oxide, calcium oxide, or other suitable hydrates or carbonates. In order to reduce the expense of transporting the demulsifying agent to the place where it is to be used to treat a petroleum emulsion, the wood sulfite liquor may, if desired, be concentrated so as to increase the specific gravity of same to approximately 30 to 32° Baumé.

The sulfonic treating material and the wood sulfite liquor or extract used to produce our treating agent or demulsifying agent can be combined in any suitable proportion and by any preferred procedure, and may be used in the acid, neutral or alkaline state. We prefer to form said demulsifying agent from approximately equal parts of the ammonium salt of di-propylated tetralin sulfonic acid and wood sulfite liquor of approximately 30° Baumé, thereby producing a mixture or compound that is readily soluble in water, and which, when used to treat a petroleum emulsion of the water-in-oil type to break the same, produces results, which, in many cases, cannot be duplicated by treating the emulsion with a demulsifying agent composed solely of sulfonic treating material or composed solely of wood sulfite liquor.

In practising our process a treating agent or demulsifying agent of the kind above described may be brought in contact with the emulsion to be treated in any of the numerous ways now employed in the treatment of petroleum emulsions of the water-in-oil type with chemical demulsifying agents, such, for example, as by introducing said agent into the well in which the emulsion is produced; introducing said agent into a conduit through which the emulsion is flowing; introducing said agent into a tank in which the emulsion is stored; or introducing said agent into a container that holds a sludge obtained from the bottom of the oil storage tank. In some instances it may be advisable to introduce the treating agent into a producing well in such a way that it will become mixed with water and oil that are emerging from the surrounding strata, before said water and oil enter the barrel of the well pump or the tubing up through which said water and oil flow to the surface of the ground.

After treatment the emulsion is allowed to stand in a quiescent state, usually in a settling tank, at a temperature varying from atmospheric temperature to about 200° F., so as to permit the water or brine to separate from the oil, it being preferable to keep the temperature low enough so as to prevent the valuable constituents of the oil from volatilizing. If desired, the treated emulsion may be acted upon by one or the other of various kinds of apparatus now used in the operation of breaking petroleum emulsions, such as homogenizers, hay tanks, gun barrels, filters, centrifuges or electrical dehydrators.

The amount of treating agent on the anhydrous basis that is required to break the emulsion may vary from approximately 1 part of treating agent to 500 parts of emulsion, up to a ratio of 1 part of treating agent to 20,000 parts of emulsion, depending upon the type or kind of emulsion being treated. In treating exceptionally refractory emulsions of the kind commonly referred to as "tank bottoms" or "residual pit oils", the minimum ratio above referred to is often necessary, but in treating fresh emulsions, i. e., emulsions that will yield readily to the action of chemical demulsifying agents, the maximum ratio above mentioned will frequently produce highly satisfactory results. For the average petroleum emulsion of the water-in-oil type a ratio of 1 part of treating agent to 5,000 parts of emulsion will usually be found to produce commercially satisfactory results.

Having described our invention, what we claim as new and desire to secure by Letters Patent of the United States is:

1. A process for breaking a petroleum emulsion of the water-in-oil type, which consists in subjecting the emulsion to the action of a demulsifying agent comprising wood sulfite liquor material and a sulfonic demulsifying body.

2. A process for breaking a petroleum emulsion of the water-in-oil type, which consists in subjecting the emulsion to the action of a water-soluble demulsifying agent comprising wood sulfite liquor material and a sulfonic demulsifying body.

3. A process for breaking a petroleum emulsion of the water-in-oil type, which consists in subjecting the emulsion to the action of a demulsifying agent comprising a wood sulfite liquor substance and a polycyclic aromatic sulfonic body.

4. A process for breaking a petroleum emulsion of the water-in-oil type, which consists in subjecting the emulsion to the action of a water-soluble demulsifying agent comprising a wood sulfite liquor substance and a polycyclic aromatic sulfonic body.

5. A process for breaking a petroleum emulsion of the water-in-oil type, which consists in subjecting the emulsion to the action of a demulsifying agent comprising a wood sulfite liquid substance and an alkylated polycyclic aromatic sulfonic body.

6. A process for breaking a petroleum emulsion of the water-in-oil type, which consists in subjecting the emulsion to the action of a water-soluble demulsifying agent comprising a wood sulfite liquor substance and an alkylated polycyclic aromatic sulfonic body.

7. A process for breaking a petroleum emulsion of the water-in-oil type, which consists in subjecting the emulsion to the action of a demulsifying agent comprising a wood sulfite liquor substance and a propylated polycyclic aromatic sulfonic treating agent.

8. A process for breaking a petroleum emulsion of the water-in-oil type, which consists in subjecting the emulsion to the action of a water-soluble demulsifying agent comprising a wood sulfite liquor substance and a propylated polycyclic aromatic sulfonic treating agent.

9. A process for breaking a petroleum emulsion of the water-in-oil type, which consists in subjecting the emulsion to the action of a demulsifying agent comprising wood sulfite liquor material and a propylated polycyclic aromatic sulfonic treating agent mixed in approximately equal proportions.

10. A process for breaking a petroleum emulsion of the water-in-oil type, which consists in subjecting the emulsion to the action of a water-soluble demulsifying agent comprising wood sulfite liquor material and a propylated polycyclic aromatic sulfonic treating agent mixed in approximately equal proportions.

MELVIN DE GROOTE.
LOUIS T. MONSON.